US007490894B2

(12) United States Patent
Oechel et al.

(10) Patent No.: US 7,490,894 B2
(45) Date of Patent: Feb. 17, 2009

(54) SLIDING ROOF SYSTEM FOR A MOTOR VEHICLE

(75) Inventors: Holger Oechel, Frankfurt am Main (DE); Stefan Kunkel, Aschaffenburg (DE); Stefan Vogel, Ortenberg (DE)

(73) Assignee: ArvinMeritor, GmbH, Dietzenbach (DE)

( * ) Notice: Subject to any disclaimer, the term of this patent is extended or adjusted under 35 U.S.C. 154(b) by 0 days.

(21) Appl. No.: 11/606,784

(22) Filed: Nov. 30, 2006

(65) Prior Publication Data

US 2007/0138841 A1 Jun. 21, 2007

(30) Foreign Application Priority Data

Dec. 15, 2005 (DE) ....................... 10 2005 060 065

(51) Int. Cl.
*B60J 7/047* (2006.01)

(52) U.S. Cl. ............................ 296/216.02; 296/216.03; 296/221

(58) Field of Classification Search ............ 296/216.02, 296/221, 216.03
See application file for complete search history.

(56) References Cited

U.S. PATENT DOCUMENTS

| | | | | | |
|---|---|---|---|---|---|
| 3,632,160 | A | * | 1/1972 | Schlapp | 296/221 |
| 4,632,449 | A | * | 12/1986 | Masuda | 296/222 |
| 4,647,106 | A | * | 3/1987 | Furst | 296/223 |
| 5,026,113 | A | * | 6/1991 | DiCarlo et al. | 296/221 |
| 5,335,961 | A | * | 8/1994 | Reinsch et al. | 296/213 |
| 5,484,185 | A | * | 1/1996 | Salz et al. | 296/220.01 |
| 5,879,049 | A | * | 3/1999 | Sinelli | 296/223 |

* cited by examiner

*Primary Examiner*—Dennis H Pedder
(74) *Attorney, Agent, or Firm*—Carlson, Gaskey & Olds

(57) ABSTRACT

A sliding roof system for a motor vehicle includes a guide rail, a cover support, a cover attached to the cover support, a front bearing block articulated to the cover support, and a carriage that is movably received in the guide rail and engages the cover support. The cover support is articulated on the front bearing block such that the cover support can be swiveled around a virtual swiveling point.

8 Claims, 7 Drawing Sheets

EXHIBIT A

EXHIBIT A

SLIDING ROOF SYSTEM FOR A MOTOR VEHICLE

RELATED APPLICATIONS

This application claims priority to German Application No. 10 2005 060 065.4, which was filed on Dec. 15, 2005.

BACKGROUND OF THE INVENTION

The invention relates to a sliding roof system for a motor vehicle. The sliding roof system includes a guide rail, a cover support, a cover attached to the cover support, a front bearing block articulated to the cover support, and a carriage movably received in the guide rail, and which engages the cover support.

In a sliding roof system of this type, the cover can be transferred by the cover support and the carriage to a so-called “venting” position in which a rear edge of the cover—as seen in a direction of travel of the vehicle—is raised outwardly. When in the venting position, a gap is formed between the rear edge of the cover and a rim of an opening in a vehicle roof, which normally is closed by the cover. The gap serves for venting an interior space. In conventional sliding roof systems, in which the cover can be swiveled into a venting position, the cover support is articulated on a front bearing block by a stationary swivel axle. Thus, the cover is swiveled around a swivel axle on the front bearing block when the cover support is raised outwardly.

Due to constructional conditions, the bearing block is usually arranged underneath and behind a front edge of the cover. As a result, swiveling movement of the cover support towards the venting position results in the front edge of the cover being swiveled to the front and downwardly. This has the effect that a weather strip, which seals in a region of a gap between the cover and an opposite rim portion of the vehicle roof, is compressed and subjected to shear strain. This generates undesirable noise and friction.

In addition, this arrangement of the swivel axle in combination with a cover, which has a curved front edge as seen in top view, has the effect of pushing lateral regions of the front edge upwardly when the cover is transferred to the venting position. This is also undesirable.

It is the object of the invention to further develop a sliding roof system of the type initially mentioned to the effect that unwanted noises and friction are avoided when the cover is moved from a closed position to a venting position, and that any unwanted displacements of the front edge of the cover are avoided.

SUMMARY OF THE INVENTION

To accomplish this objective, a cover support is articulated on a front bearing block such that the cover support can be swiveled around a virtual swiveling point. The virtual swiveling point or, in other words, an instantaneous center of rotation of movement of the cover, can be selected according to requirements such that a weather strip is not compressed in an undesired way or subjected to shear strain. In doing so, it is possible to avoid any unwanted noise and friction. It is also possible to prevent outer regions of a cover having a curved front edge from being pushed upwardly when the cover is transferred to a venting position.

In one example, provision is made that the virtual swiveling point lies above the cover. This has the effect that a front edge of the cover, when the cover is swiveled from a closed position into the venting position, shows a tendency to swivel to the rear, i.e. separates from the weather strip without any problems.

According to one embodiment, the front bearing block is movably arranged in a guide rail, a rear bearing block is provided that is coupled to the cover support and likewise can be moved in the guide rail, and a latching hook is provided that can immobilize the rear bearing block in a fixed position in the guide rail. The use of front and rear bearing blocks, which are movably arranged in the guide rail, not only allows the cover to be moved into a venting position, but also into a fully open position in which a roof opening in the vehicle roof is completely exposed, or at least substantially exposed.

These and other features of the present invention can be best understood from the following specification and drawings, the following of which is a brief description.

DETAILED DESCRIPTION OF THE PREFERRED EMBODIMENT

Figure 1:
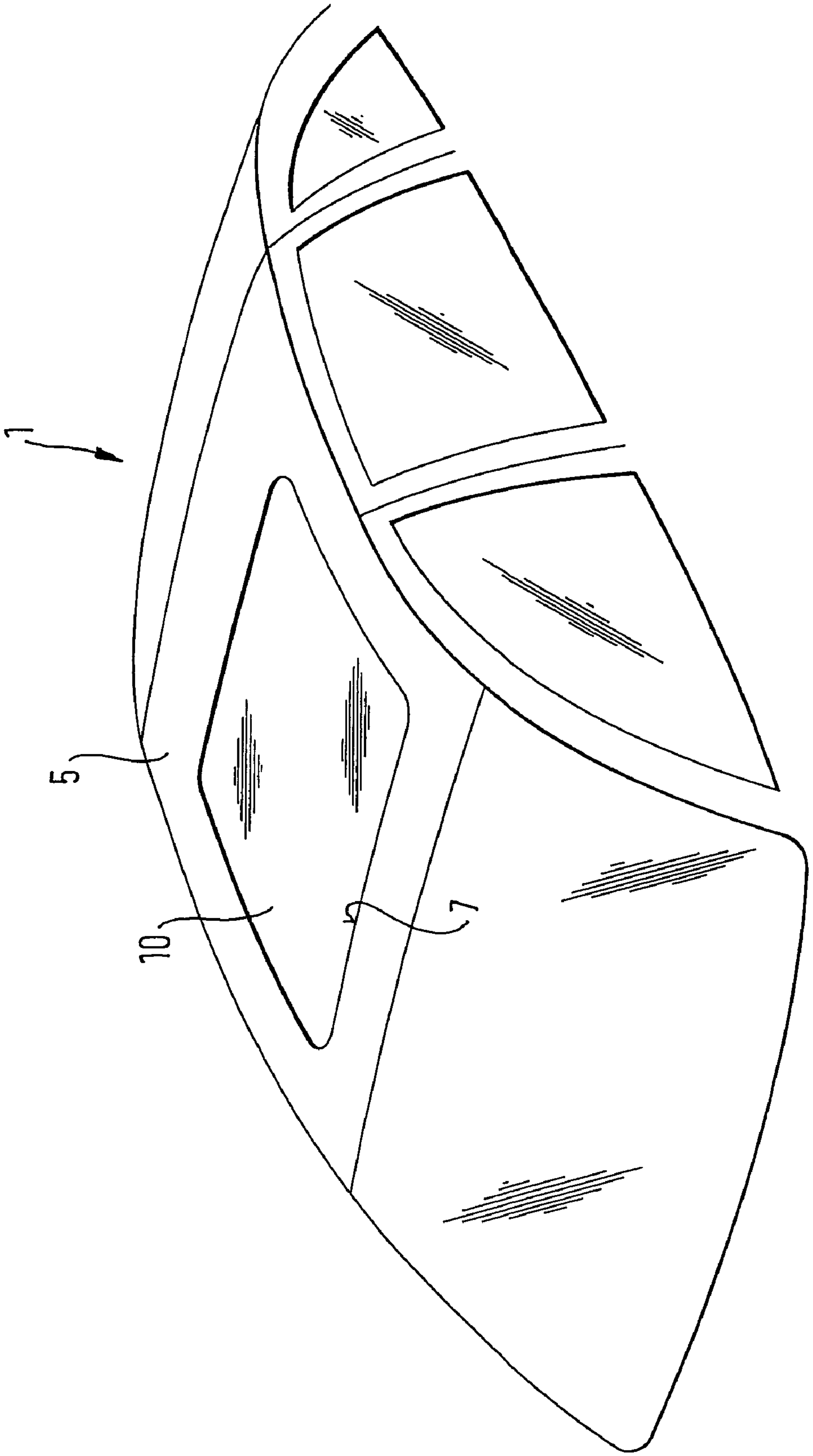
FIG. 1 is a perspective view of a vehicle roof including a sliding roof system.

FIG. 1 schematically shows a vehicle roof 1 which has an outer rigid roof skin 5. Formed in the roof skin 5 is an opening, the rim of which is identified by reference symbol 7. Arranged within the opening is a cover 10 which may be made of sheet metal, plastic, glass or any other suitable material. When the cover 10 is in a closed position, the cover 10 tightly closes the opening in the vehicle roof 1. Starting from the closed position which is shown in FIG. 1, the cover 10 can be transferred to a venting position in a known manner, which is distinguished in that a rear edge of the cover 10 is raised outwardly, so that a slot is formed between the cover 10 and the rim 7 of the opening in the vehicle roof 1, through which slot an interior space of a vehicle can be vented. The cover 10 can also be adjusted to assume a position which is opened to a more or less degree, in which the cover is shifted in a longitudinal direction of the vehicle, so that the opening in the vehicle roof 1 is exposed.

As far as terms such as “front,” “rear,” “up,” “down,” etc. are used for describing the invention, these are based on the usual designations on a vehicle. Thus, “front” designates a direction in which the vehicle normally moves during forward movement.

Figure 10:
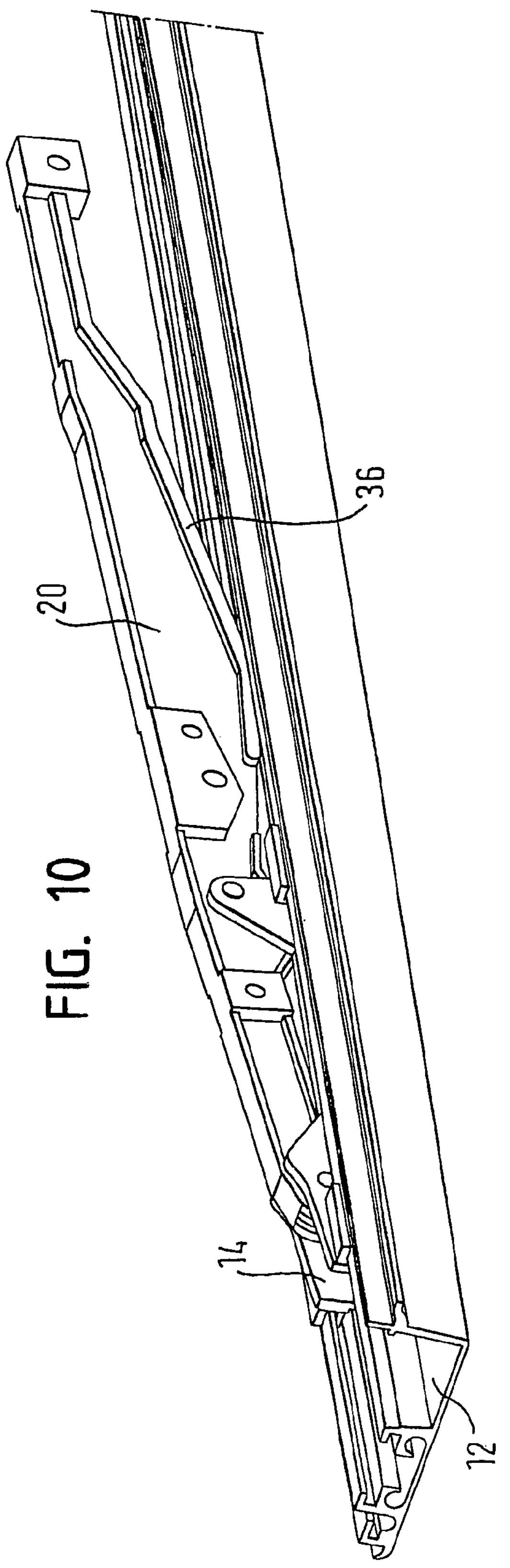
FIG. 10 shows in a perspective view the assembly of FIG. 9 inserted in a guide rail.
Figure 9:
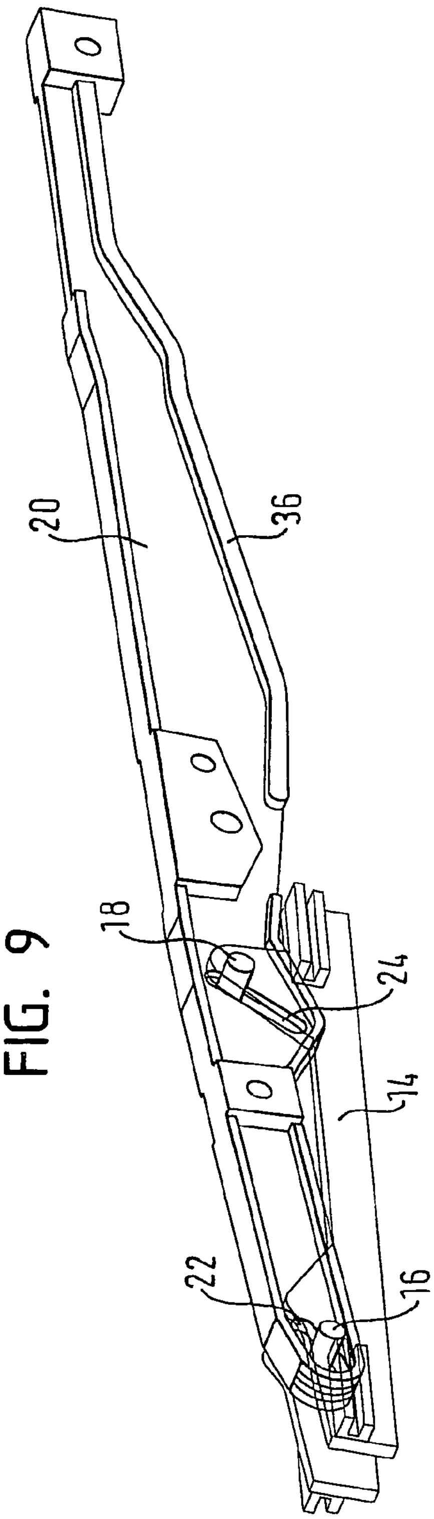
FIG. 9 shows the assembly of FIG. 8, with the front bearing block being shown in transparent illustration.

The cover 10 is part of a sliding roof system having two guide rails 12, which in the longitudinal direction of the vehicle, extend generally parallel to longitudinal edges of the opening in the vehicle roof 1. A guide rail 12 is shown in FIG. 10. Arranged in each guide rail 12 is a front bearing block 14 which can be shifted in the longitudinal direction in the guide rail 12. Each of the bearing blocks 14 has two guiding bolts 16, 18 (FIG. 2) which extend transverse to the longitudinal direction of the guide rails 12.

Figure 7:
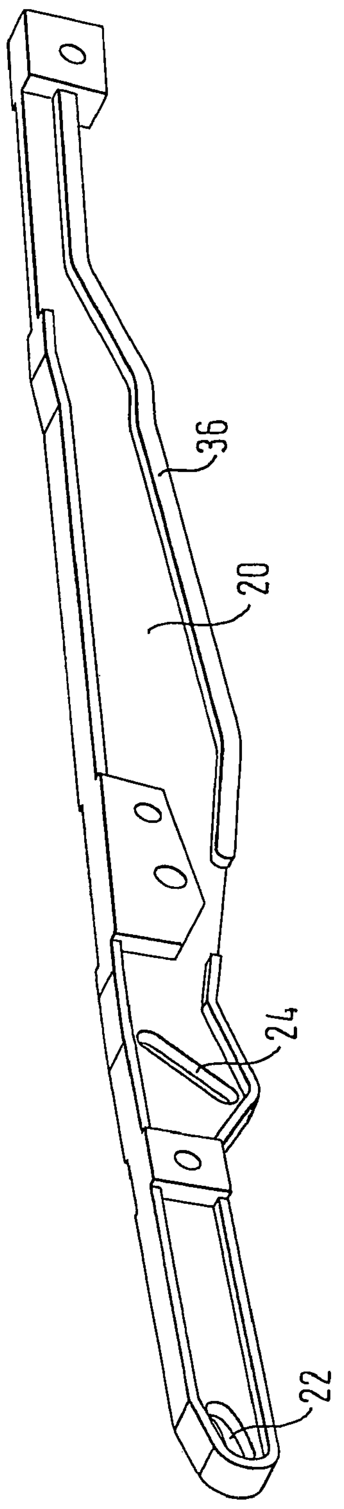
FIG. 7 shows in a perspective view the cover support of the sliding roof system.
Figure 8:
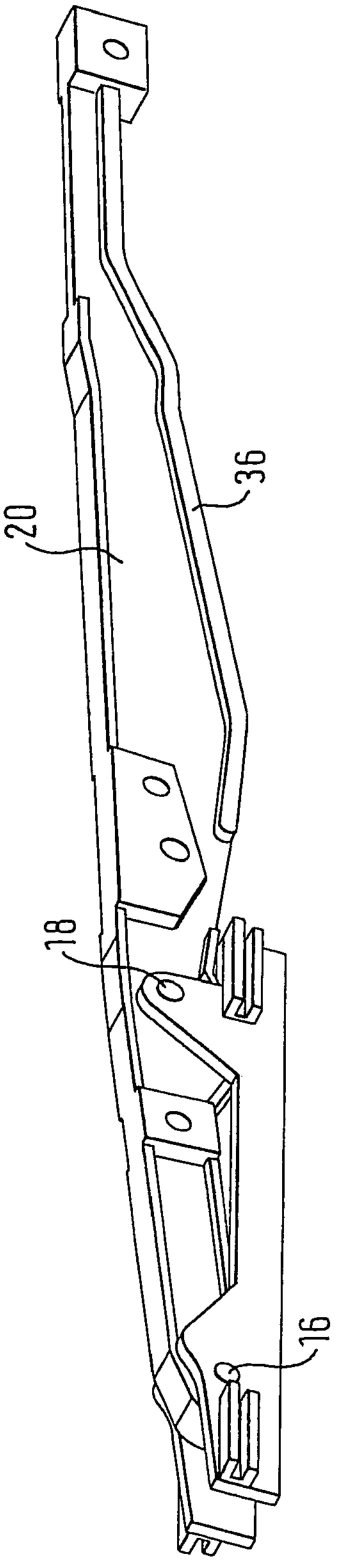
FIG. 8 shows in a perspective view an assembly formed by a cover support and a front bearing block.
Figure 11:
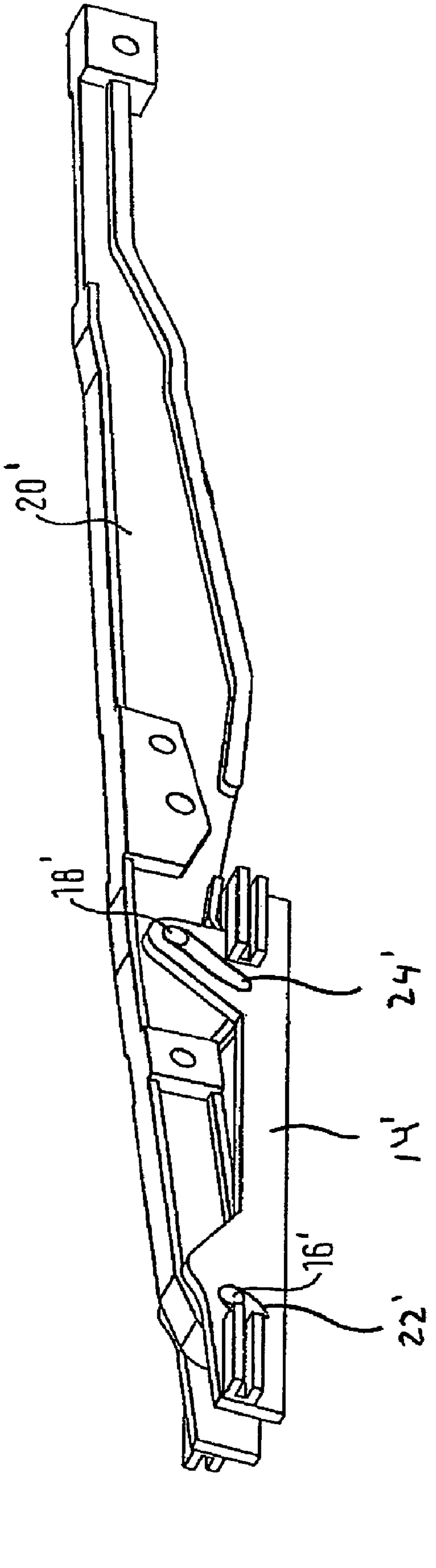
FIG. 11 shows in a perspective view another example of an assembly formed by a cover support and a front bearing block.

A cover support 20 is pivotally attached to each front bearing block 14. The cover support 20 supports the cover 10. For a connection to the front bearing block 14, the cover support 20 is provided with a front guiding slot 22 and a rear guiding slot 24. The guiding bolt 16 of the front bearing block 14 engages in the front guiding slot 22, and the guiding bolt 18 engages in the rear guiding slot 24. In combination with the front 22 and rear 24 guiding slots, the guiding bolts 16, 18 each form a slide guide. The front guiding slot 22 is designed to be curved and extends across a small angular area. A center of curvature of the front guiding slot 22 lies above the cover 10. As clearly shown in FIG. 7, the rear guiding slot 24 extends in a straight line and obliquely from the bottom to the top when viewed from the front to the rear. In general terms, both the front 22 and rear 24 guiding slots extend obliquely upwardly to the rear. It is also possible that the slide guides are formed by guiding slots 22', 24' configured in the bearing block 14' and guiding blots 16', 18,' arranged on the cover support 20' as shown in FIG 11.

Figure 6:
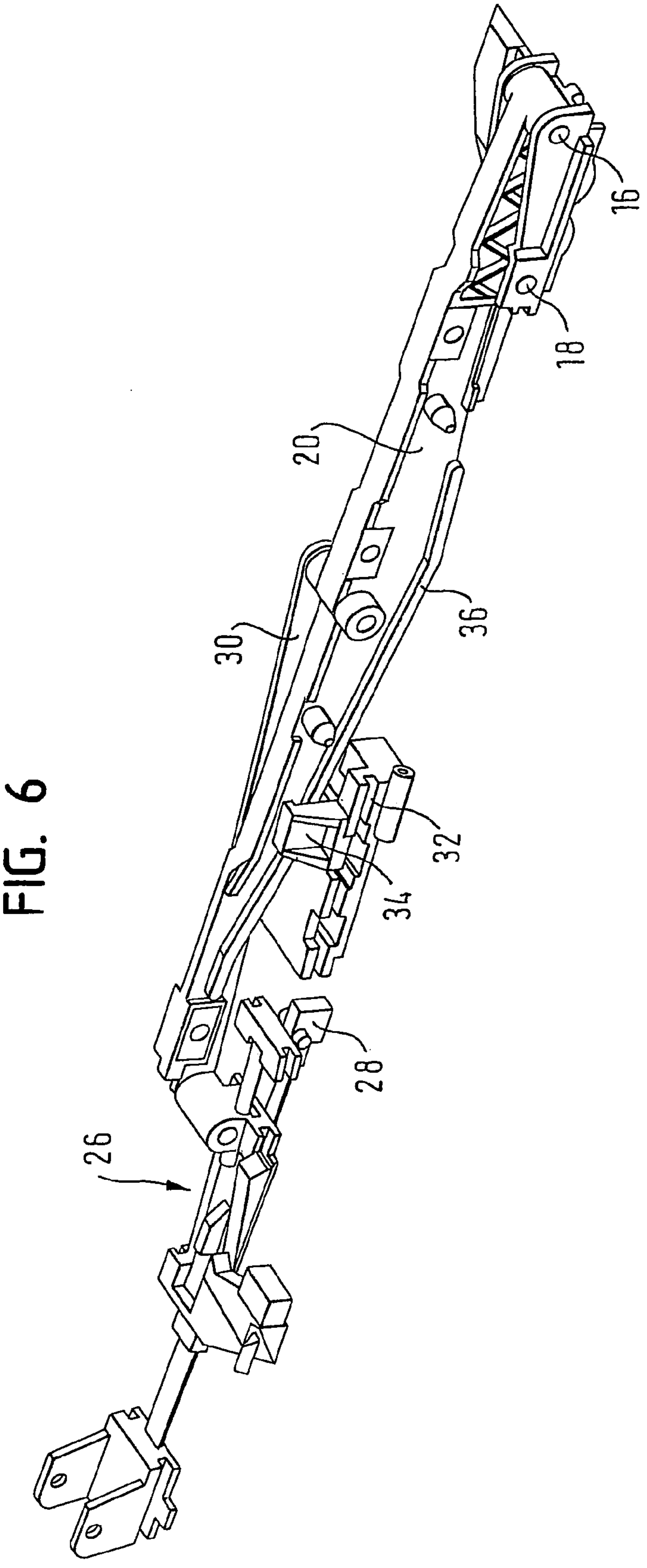
FIG. 6 shows in a schematic, perspective view the various components of the sliding roof system, with guide rail and cover having been omitted for better clarity.

Each of the guide rails 12 also has a rear bearing block 26 (FIG. 6) movably arranged in the guide rail 12. Provided on the rear bearing block 26 is a latching hook 28 that can latch in place in a recess (not shown) of the guide rail 12. A connecting arm 30 is pivotally attached to the rear bearing block 26. The connecting arm 30 is also pivotally attached to the cover support 20. The connecting arm 30 extends approximately in a horizontal direction when the cover is in the closed position.

A carriage 32 is also movably arranged in the guide rail 12. The carriage 32 engages a control rib 36 of the cover support 20 via a guide bracket 34. In order to adjust the carriage 32, it is possible to use drive cables in a known manner, which are linked with an electric motor or any other suitable drive apparatus.

Figure 2:
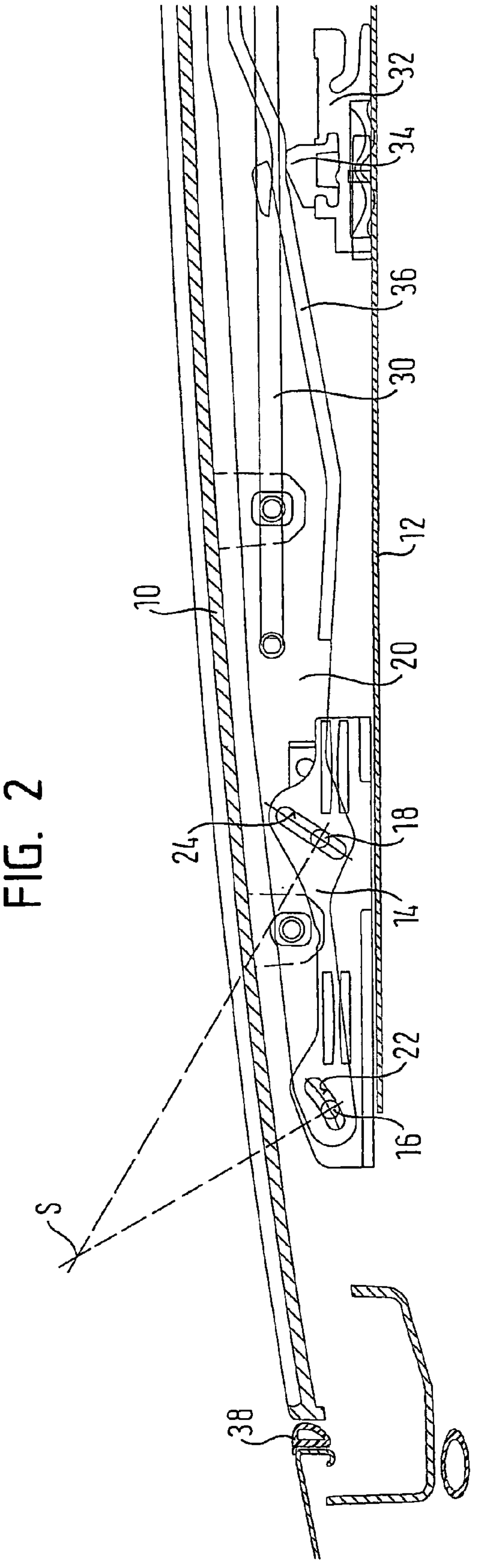
FIG. 2 shows in a schematic section a sliding roof system, with the cover being in a closed position.

FIG. 2 shows the sliding roof system in a condition in which the cover 10 is in the closed position. The carriage 32, along with the guide bracket 34, is roughly in a middle position. The control rib 36, in generalized terms, can be considered to extend obliquely from a bottom front in an upward direction to the rear. When the carriage 32 is moved to the rear starting from the position shown in FIG. 2, i.e. to the right with regard to FIG. 2, the cover will be lowered and transferred to the rear into an open position in which the cover lies partially or completely underneath the roof skin 5 of the vehicle roof 1. In the course of this motion, the latching hook 28 will be moved in an upward direction by the carriage 32, so that the rear bearing block 26 and, together with the latter, the connecting arm 30, the cover support 20 and the front bearing block 14 will be entrained to the rear. This is known and will not be discussed in further detail.

In order to shift the cover to the venting position, the carriage 32 is moved to the front starting from the position shown in FIG. 2. In this process, the guide bracket 34 pushes the control rib 36 upwardly (cf. the positions of carriage 32 and cover support 20 in FIGS. 2 and 3), whereby the cover support 20 will be lifted. In the longitudinal direction the cover support 20 is arrested by the connecting arm 30 which is articulated on the rear bearing block 26, which in turn is immovably retained in the guide rail 12 by the latching hook 28. As the cover support 20 has a large length compared with vertical swiveling movement of the front end of the connecting arm 30, the cover support 20 is only slightly pulled to the rear when the cover support 20 is moved towards the venting position.

Figures 3, 4, 5:
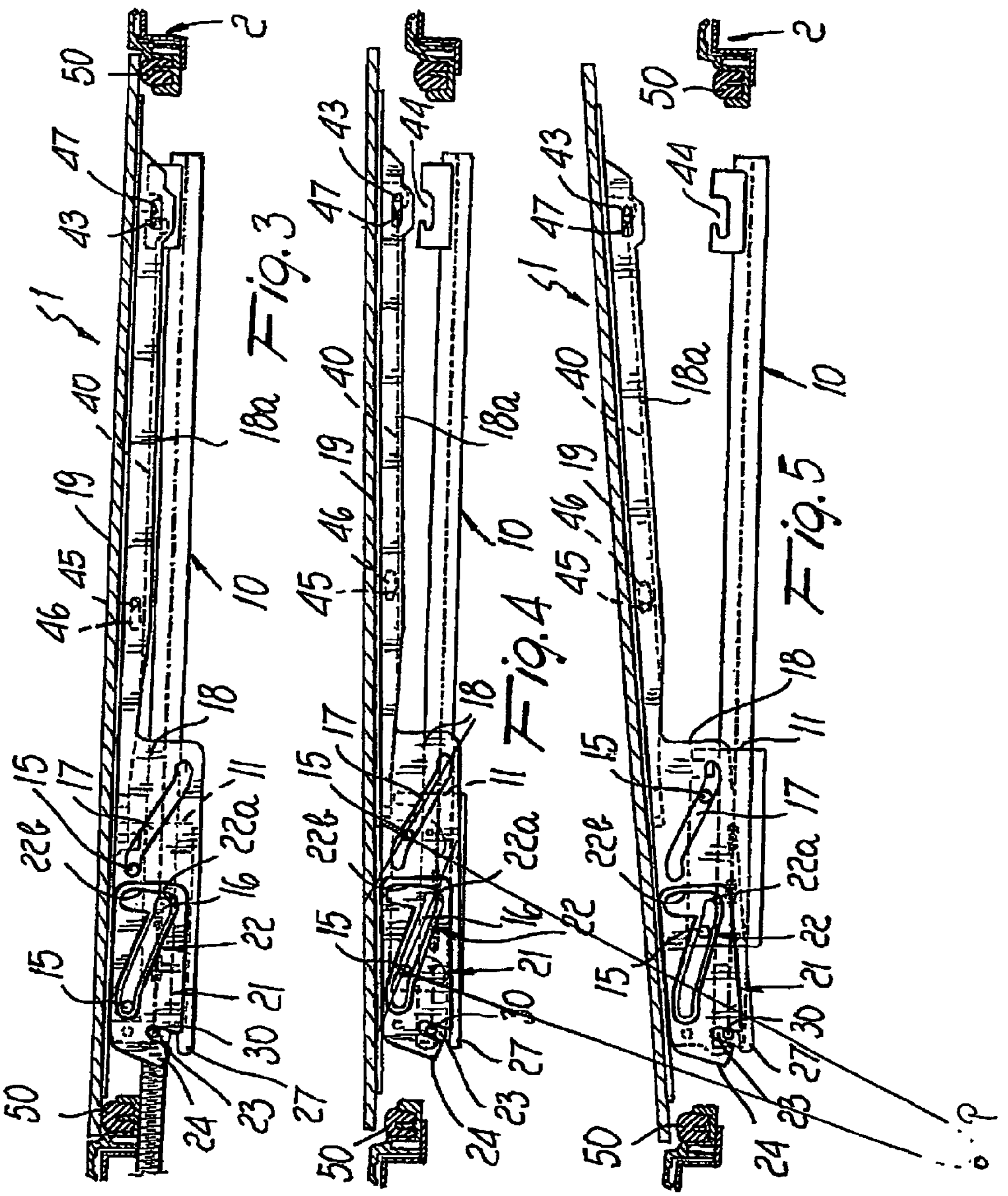
FIG. 3 shows the sliding roof system of FIG. 2, with the cover having been swiveled slightly towards a venting position.
FIG. 4 shows the sliding roof system of FIG. 3, with the cover having been swiveled further towards the venting position.
FIG. 5 shows the sliding roof system of FIG. 4 with the cover being in the venting position.

When the cover support 20 is lifted by the guide bracket 34 of the carriage 32, the cover support 20 performs a swiveling movement around a virtual swiveling point which is defined by an intersection point of a vertical line on the directions of motion which are dictated by the two slide guides (guiding bolt 16, front guiding slot 22; and guiding bolt 18, rear guiding slot 24). The swiveling point is indicated in FIG. 3 with reference symbol S. The swiveling point S lies above the cover 10, but behind a front edge of the cover 10. The swiveling point S can also be referred to as an instantaneous center of rotation of the movement of the cover 10. Due to a spatial position relative to the front edge of the cover 10, when the cover support 20 is lifted by the carriage 32, the cover 10 performs a movement approximately in the direction of arrow P of FIG. 3, namely away from a weather strip 38 which is arranged on the rim 7 of the opening in the roof skin 5. It can be seen that the front edge of the cover 10 moves away from the weather strip 38 obliquely to the rear, when the cover 10, starting from the closed position is moved towards the venting position. FIG. 4 shows an intermediate position in which the cover 10 has been moved beyond the slightly opened position of FIG. 3 further towards the venting position. It can be seen that the front edge of the cover 10 is still further away from the weather strip 38. It is due to the alteration of the directions of movement, and the movement positions in the slide guides, that the virtual swiveling point S has been displaced. Now the swiveling point S is at a higher level and further to the front than in the condition shown in FIG. 3.

FIG. 5 shows the cover 10 in the venting position, raised outwardly by the maximum extent. The front edge of the cover 10 now has the maximum distance to the weather strip 38. It will be appreciated, however, that by suitably selecting the virtual swiveling point S, the swiveling movement of the cover 10 can be adjusted in practice such that the front edge of the cover 10 still has a slight contact with the weather strip 38, when the cover 10 is in the venting position. It is crucial that—unlike in prior art—the front edge of the cover 10 is moved away from the weather strip 38 when the cover 10, starting from the closed position, is shifted towards the venting position. The above explanations also apply, of course, when the weather strip 38 is attached to the cover 10 and not to the vehicle roof.

By a suitable selection of the virtual swiveling point S, it is also possible to adjust the movement of the cover 10 such that a middle region of the front edge is slightly lowered when the cover 10 is transferred to the venting position, while lateral regions of the front edge remain approximately at the same level. This is of advantage with a cover having a front edge which has a pronounced curvature in a transverse direction. By suitably selecting the virtual swiveling point S it is also possible to adapt the movement of the front edge of the cover 10 to other requirements. The curvature of the front guiding slot 22 can be varied along its length, the orientation of the front 22 and rear 29 guiding slots can be changed, or the rear guiding slot 24 can be configured so as to be curved, for example, in order to adjust the position and the displacement of the virtual swiveling point S in the desired way when the cover 10 is transferred to the venting position.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A sliding roof system for a vehicle, comprising:

a guide rail;

a cover support;

a cover attached to the cover support;

a front bearing block articulated to the cover support, wherein the cover support is coupled to the front bearing block through at least one slide guide, and wherein the at least one slide guide comprises at least a front guide slot and a rear guide slot formed in one of the cover support and front bearing block and includes a front guide bolt received in the front guide slot and a rear guide bolt received in the rear guide slot, and wherein the front and rear guide bolts are associated with the other of the cover and front bearing block; and a carriage movably received in the guide rail and engaging the cover support, wherein the cover support is articulated on the front bearing block such that the cover support can be swiveled around a virtual swiveling point that lies above the cover, the virtual swiveling point being defined by the front bearing block.

2. A sliding roof system for a vehicle, comprising:

a guide rail;

a cover support;

a cover attached to the cover support;

a front bearing block articulated to the cover support, and wherein the cover support is coupled to the front bearing block through at least one slide guide that comprises a front slide guide and a rear slide guide; and a carriage movably received in the guide rail and engaging the cover support, wherein the cover support is articulated on the front bearing block such that the cover support can be swiveled around a virtual swiveling point that lies above the cover.

3. The sliding roof system according to claim 2, wherein the front slide guide has a curved guiding slot.

4. A sliding roof system for a vehicle, comprising:

a guide rail;

a cover support;

a cover attached to the cover support;

a front bearing block articulated to the cover support, and wherein the cover support is coupled to the front bearing block through at least one slide guide that comprises a front slide guide and a rear slide guide, the front slide guide having a curved guiding slot wherein a center of curvature of the curved guiding slot lies above the cover; and a carriage movably received in the guide rail and engaging the cover support, wherein the cover support is articulated on the front bearing block such that the cover support can be swiveled around a virtual swiveling point.

5. The sliding roof system according to claim 2, wherein the rear slide guide has a rectilinear guiding slot.

6. A sliding roof system for a vehicle, comprising:

a guide rail;

a cover support;

a cover attached to the cover support;

a front bearing block articulated to the cover support, and wherein the cover support is coupled to the front bearing block through at least one slide guide that comprises a front slide guide and a rear slide guide, with the rear slide guide having a rectilinear guiding slot that extends obliquely from a bottom front in an upward direction to the rear; and a carriage movably received in the guide rail and engaging the cover support, wherein the cover support is articulated on the front bearing block such that the cover support can be swiveled around a virtual swiveling point.

7. A sliding roof system for a vehicle, comprising:

a guide rail;

a cover support;

a cover attached to the cover support;

a front bearing block articulated to the cover support and wherein the front bearing block is movably arranged in the guide rail;

a rear bearing block that is coupled to the cover support and is movable in the guide rails and wherein the cover support is coupled to the rear bearing block by a connecting arm that is pivotally articulated on the cover support and the rear bearing block;

a latching hook that can immobilize the rear bearing block in a fixed position in the guide rail; and a carriage movably received in the guide rail and engaging the cover support, wherein the cover support is articulated on the front bearing block such that the cover support can be swiveled around a virtual swiveling point that lies above the cover.

8. The sliding roof system according to claim 1 wherein the virtual swiveling point is defined by an intersection of vertical lines on directions of motion defined by movement of the front and rear guide bolts within the front and rear guide slots, respectively.

* * * * *

UNITED STATES PATENT AND TRADEMARK OFFICE

CERTIFICATE OF CORRECTION

PATENT NO. : 7,490,894 B2

APPLICATION NO. : 11/606784

DATED : February 17, 2009

INVENTOR(S) : Oechel et al.

It is certified that error appears in the above-identified patent and that said Letters Patent is hereby corrected as shown below:

Claim 7, Column 6, Line 35: Change “rails” to --rail,--

Signed and Sealed this

Twelfth Day of May, 2009

JOHN DOLL

*Acting Director of the United States Patent and Trademark Office*